US010124634B2

(12) United States Patent
Poulin et al.

(10) Patent No.: US 10,124,634 B2
(45) Date of Patent: Nov. 13, 2018

(54) TIRE PRESSURE MONITORING SYSTEM EMULATION DEVICE AND METHOD

(71) Applicant: FZ Engineering Inc., Montreal (CA)

(72) Inventors: Frederic Poulin, Granby (CA); Mykolai Dutkewych, Franklin (CA)

(73) Assignee: FZ Engineering Inc., Montreal, QC (CA)

( * ) Notice: Subject to any disclaimer, the term of this patent is extended or adjusted under 35 U.S.C. 154(b) by 0 days.

(21) Appl. No.: 15/837,142

(22) Filed: Dec. 11, 2017

(65) Prior Publication Data

US 2018/0194177 A1 Jul. 12, 2018

Related U.S. Application Data

(60) Provisional application No. 62/433,475, filed on Dec. 13, 2016.

(51) Int. Cl.
*B60C 23/00* (2006.01)
*B60C 23/04* (2006.01)

(52) U.S. Cl.
CPC ........ *B60C 23/0471* (2013.01); *B60C 23/042* (2013.01); *B60C 23/0415* (2013.01); *B60C 23/0433* (2013.01); *B60C 23/0435* (2013.01); *B60C 23/0483* (2013.01)

(58) Field of Classification Search
CPC ............ B60C 23/0471; B60C 23/0408; B60C 23/0433; B60C 23/0422; B60C 23/0415; B60C 23/042; B60C 23/0435; B60C 23/0438

USPC ........................................................ 340/447
See application file for complete search history.

(56) References Cited

U.S. PATENT DOCUMENTS

| 7,259,663 | B2* | 8/2007 | Ogawa ................ B60C 23/0408 340/447 |
| 7,336,163 | B2* | 2/2008 | Fujii ................... B60C 23/0408 340/447 |
| 7,382,239 | B2* | 6/2008 | Song ................... B60C 23/0408 340/442 |
| 7,482,913 | B2* | 1/2009 | Kusunoki .......... B60C 23/0416 340/442 |
| 7,503,210 | B2* | 3/2009 | Lauer ................. B60C 23/0416 340/447 |

* cited by examiner

*Primary Examiner* — John A Tweel, Jr.
(74) *Attorney, Agent, or Firm* — Angelhart et al.

(57) ABSTRACT

A wireless tire pressure monitoring system (TPMS) emulation device for a vehicle and a method of activating the device. The device has a memory, a microcontroller, a radio frequency transmitter, a trigger, an actuator and a power supply. The memory is adapted to have stored thereon a software module. The microcontroller is powered by a power supply, such as a battery, and is connected to the memory. The microcontroller is adapted to control a TPMS transmission signal indicative of an acceptable tire pressure signal, according to the software module. The radio frequency transmitter is connected to the microcontroller and is adapted to transmit the transmission signal. The trigger is connected to the microcontroller and is adapted to activate a TPMS sensor pairing of the emulation device for at least one tire of the vehicle. The actuator is connected to the microcontroller and is adapted to activate the emulation device.

2 Claims, 8 Drawing Sheets

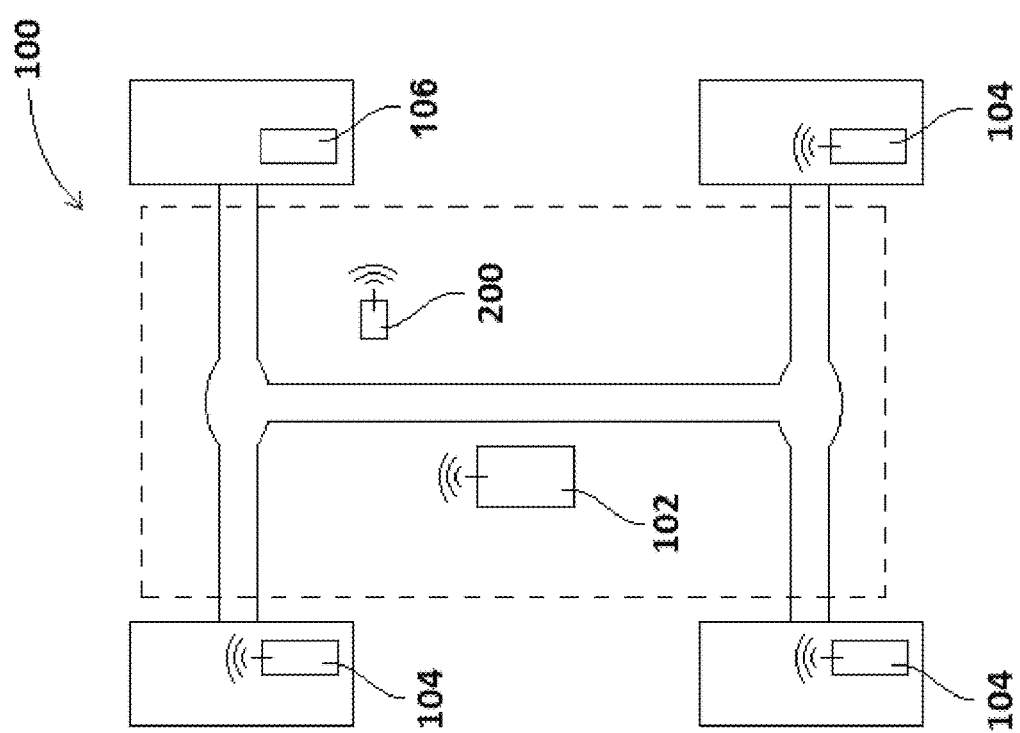

TIRE PRESSURE MONITORING SYSTEM EMULATION DEVICE AND METHOD

CROSS-REFERENCE TO RELATED APPLICATIONS

This application is a non-provisional claiming priority of U.S. provisional 62/433,475 filed on Dec. 13, 2016, the content of which is hereby incorporated by reference.

TECHNICAL FIELD

The present relates to tire pressure monitoring systems (TPMS) and more particularly to a device for emulating the TPMS.

BACKGROUND

Tire Pressure Monitoring Systems (TPMS) have been used on luxury vehicles since the 1980's and implemented in light motor vehicles since Sep. 1 2007 in accordance with the Transport Recall Enhancement, Accountability and Documentation Act (TREAD Act). TPMS allows monitoring information related to a vehicle tire, such as tire air pressure. The TPMS transmits this monitoring information to the vehicle's onboard computer. For instance, when the air pressure in one or more of the tires is not sufficient, the onboard computer triggers an alert to inform the vehicle driver. Direct type systems use a wireless sensor in each of the four tire air chambers to communicate temperature and pressure related information to the vehicle's onboard computer. Presented in FIG. 1A is a vehicle 100 having a conventional direct type TPMS. The TPMS has an onboard computer 102 adapted to receive tire parameter information from sensors 104 positioned within each tire of the vehicle 100. The onboard computer 102 is adapted to send a general tire status information to a driver communication interface, such as a dashboard, according to the received tire parameter information. If the information received by the onboard computer 102 is not within the threshold set by the manufacturer, the onboard computer 102 sends an alert trigger to the dashboard, in order to inform the driver of a tire problem. In some cases, the alert trigger will disable the entire dashboard from its other functions as well as other display information.

Although the use of TPMS may be beneficial in detecting tire pressure or temperature issues, in many instances drivers experience false warnings that are unnecessarily expensive to repair in addition to being distracting and annoying for the driver. For instance, in the event where one of the four sensors 104 malfunctions, such as indicated by malfunctioning sensor 106 of FIG. 1B, the driver is alerted just as though the tire pressure were inadequate. The onboard computer 102 will also raise an alert if one or more sensors are removed from the vehicle. This situation is often encountered with the installation of winter tires, off-road tires, race tires or simply for vehicles having multiple sets of tires, since TPMS units are often physically damaged with the removal and installation of tires on the vehicle wheels. Moreover, Original Equipment Manufacturer (OEM) TPMS units are placed inside each vehicle's tire and are not easily accessible or replaceable in case of a fault. The sensors 104 are battery powered and have a certain lifespan after which their signal strength depletes and eventually causes them to stop functioning. It has also been noticed that steel belted radial tires block signal transmission paths and prevent transmission of information from the wireless sensors to the onboard computer 102, thereby generating a false warning. TPMS warnings could indeed be generated for various reasons that are not always due to a faulty tire. Repairing a false TPMS warning often requires the skills of an automotive mechanic and unnecessarily increases the maintenance cost of the vehicle.

In order to ignore such warnings from the TPMS, some have developed a device that eliminates receiving a TPMS signal. The device sends a wired signal to the onboard computer 102 indicating that the tire pressures are within the prescribed threshold. However, TPMS signals from all four wireless sensors become undetectable and even true warnings from the TPMS sensor are ignored. Moreover, the existing device is vehicle specific, complicated to install and often requires special skills to install. For example, Macht Schnell™ TPMS/RDC overriding module 108, as presented in prior art FIG. 1C, is manufactured specifically for BMW vehicles and is limited to North American BMW vehicle models only. As presented in FIGS. 1D and 1E, the module 108 needs to be physically hardwired into the car's TPMS system by the tire pressure control (RDC) wiring harness 110 o function. The module 108 must be connected directly to the car's onboard computer 102 via the original tire pressure control wiring harness 110, overriding the OEM TPMS/RDC module entirely. When activated, such as by lifting up a driver's side window, the module communicates with the onboard computer 102 telling it that it has received the correct pressure readings from all four tires in order to ignore any signal from the sensor including "o.k." signals, true warning signals and false warning signals. This system entirely disables the tire pressure monitoring system by generating a wired signal between the physical RDC module and the onboard computer 102.

There is a need for a device that allows to ignore a TPMS false warning coming only from a specific tire 106 and still allow TPMS sensors 104 that function correctly to communicate with the onboard computer 102. If the driver of the vehicle sees a warning signal with respect to one tire, the driver should have the choice to ignore that warning signal and still have the possibility to monitor the tire status of the other properly functioning tires. Moreover, there is a need for a device that is easier to install without requiring the help of a mechanic with special skills.

SUMMARY

In accordance with one aspect, there is a wireless tire pressure monitoring system (TPMS) emulation device for a vehicle. The device has a memory, a microcontroller, a radio frequency transmitter, a trigger, an actuator and a power supply. The memory is adapted to have stored thereon a software module. The microcontroller is powered by a power supply, such as a battery, and is connected to the memory. The microcontroller is adapted to control a TPMS transmission signal indicative of an acceptable tire pressure signal, according to the software module. The radio frequency transmitter is connected to the microcontroller and is adapted to transmit the transmission signal. The trigger is connected to the microcontroller and is adapted to activate a TPMS sensor pairing of the emulation device for at least one tire of the vehicle. The actuator is connected to the microcontroller and is adapted to activate the emulation device.

In accordance with another aspect, there is a method of activating a tire pressure monitoring system (TPMS) emulation device. The method includes setting a vehicle onboard computer into learn mode. Then synchronizing the TPMS emulation device with the onboard computer and activating the emulation device. The method further includes transmitting an emulated signal to the onboard computer.

BRIEF DESCRIPTION OF THE DRAWINGS

Further features and advantages of the present invention will become apparent from the following detailed description, taken in combination with the appended drawings, in which:

FIG. 2 presents a vehicle having a TPMS and an activated wireless TPMS emulation device, according to one embodiment;

It will be noted that throughout the appended drawings, like features are identified by like reference numerals.

DETAILED DESCRIPTION

Figure 1A:
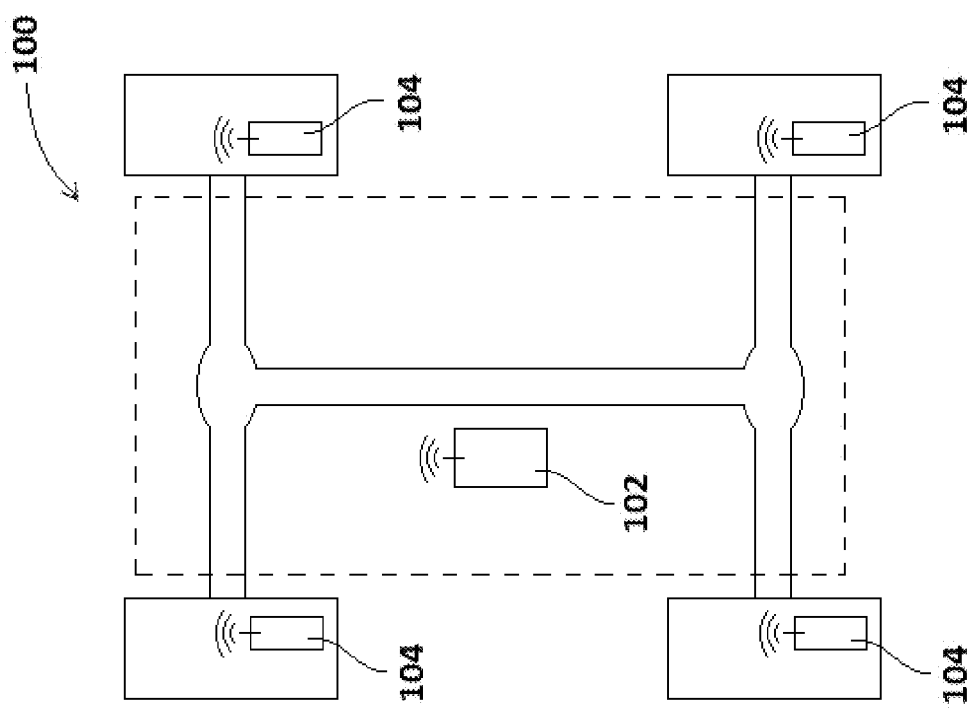
FIG. 1A presents a vehicle having a TPMS onboard computer and wheels with properly functioning TPMS sensors, according to the prior art.
Figure 1B:
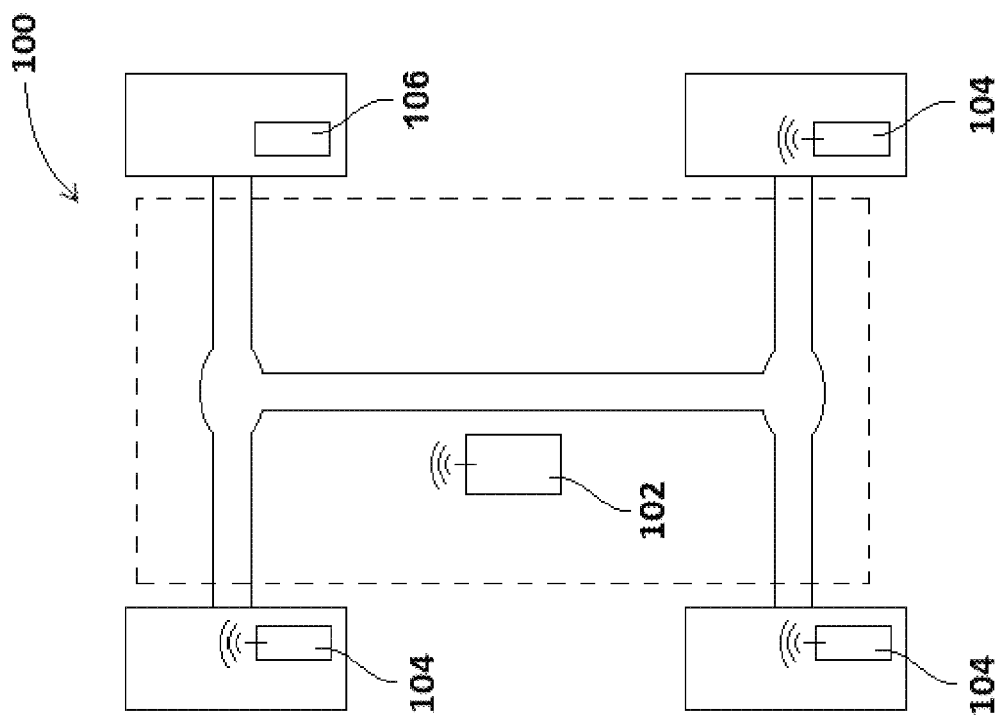
FIG. 1B presents the vehicle of FIG. 1A having a TPMS onboard computer, wheels with properly functioning TPMS sensors and a wheel with a non-functional TPMS sensor, according to the prior art.
Figure 1D:
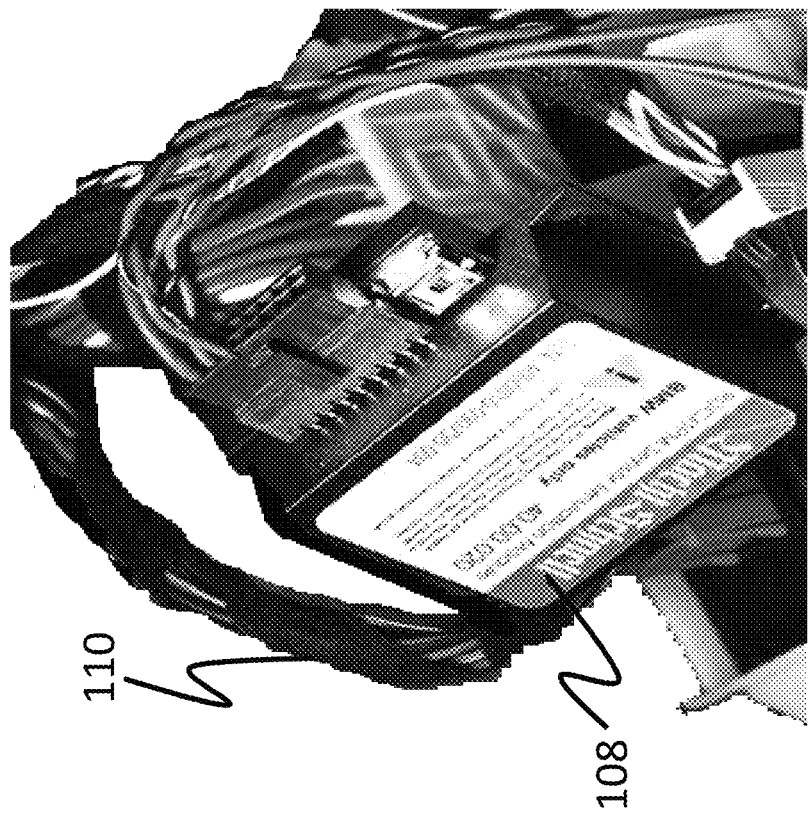
FIG. 1D presents the prior art Macht Schnell™ TPMS/RDC overriding module of FIG. 1C that is installed under the dashboard of the vehicle of FIG. 1A.
Figure 1C:
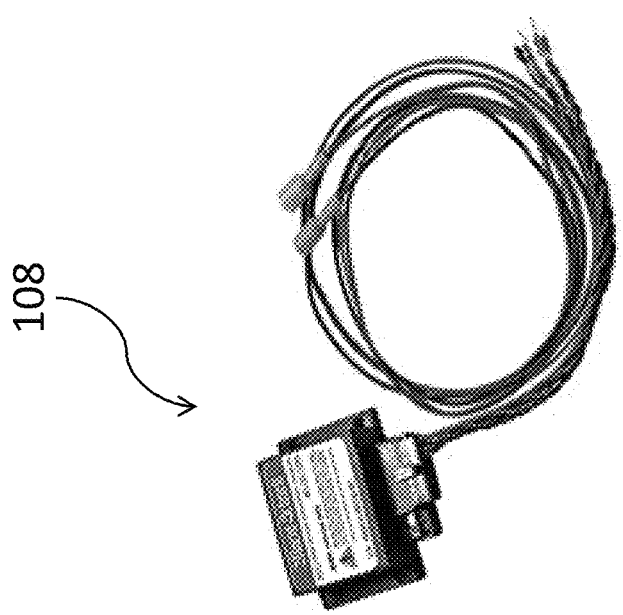
FIG. 1C presents a prior art Macht Schnell™ TPMS/RDC overriding module.
Figure 1E:
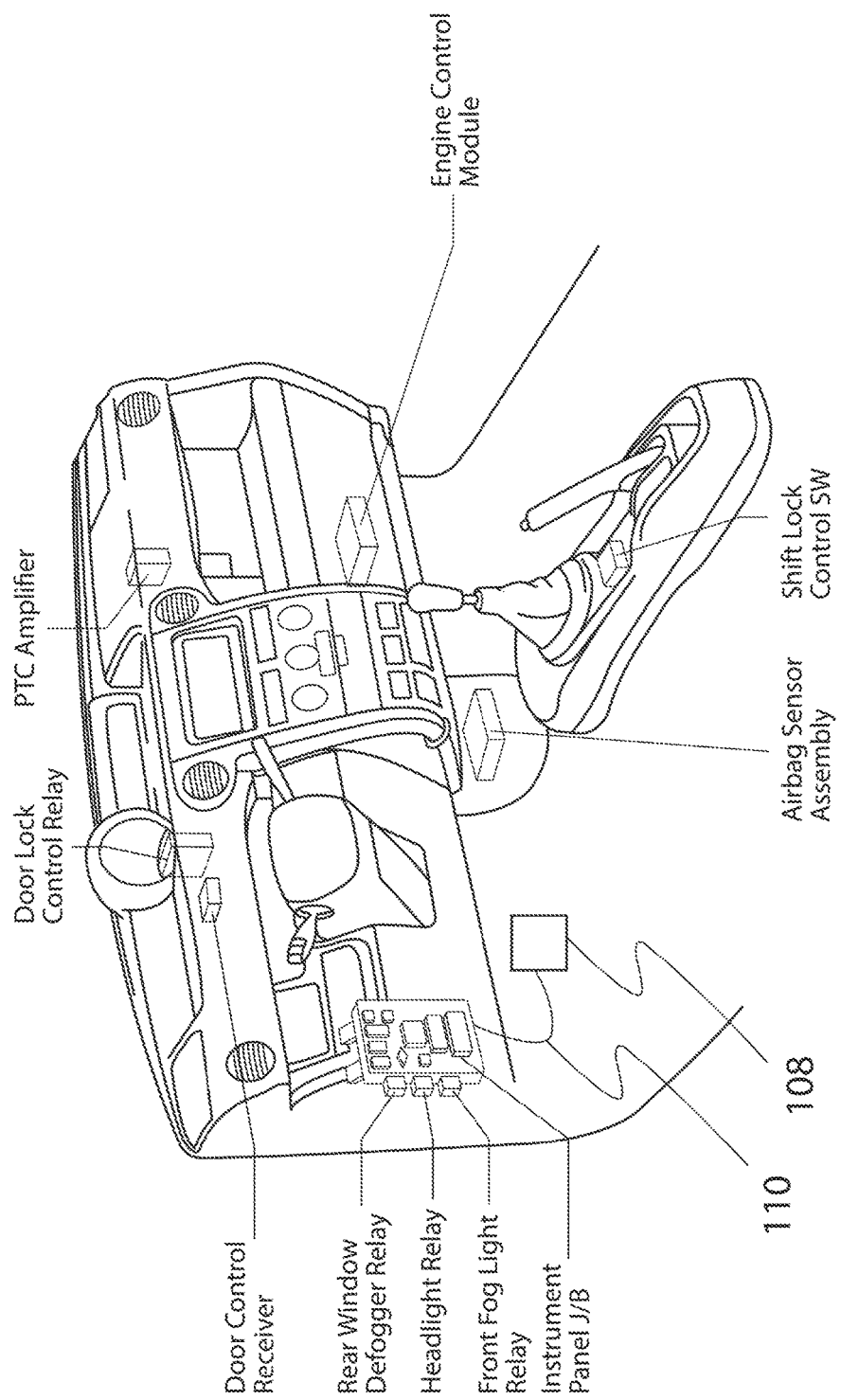
FIG. 1E presents schematic view of the prior art Macht Schnell™ TPMS/RDC overriding module of FIG. 1C that is installed under the dashboard of the vehicle of FIG. 1A.

Presented in FIG. 2 is a wireless TPMS emulation device 200 which is placed in a vehicle to eliminate TPMS warning information or alerts related to a specific TPMS sensor 104. The TPMS emulation device 200 is able to emulate the Radio Frequency (RF) communication signal of at least one original TPMS sensor unit 104 positioned in a wheel or tire of a vehicle 100. The device 200 is adapted to send tire information signals each associated to a respective tire of the vehicle 100. The tire information signal includes, amongst others, a unique tire identifier and related tire information such as tire pressure and tire temperature information in order to emulate a signal of the corresponding original TPMS sensor unit 104. The information transmitted by the device 200 is adapted to indicate an acceptable tire pressure and an acceptable temperature information on the vehicles 100 original TPMS communication frequency.

Figure 3:
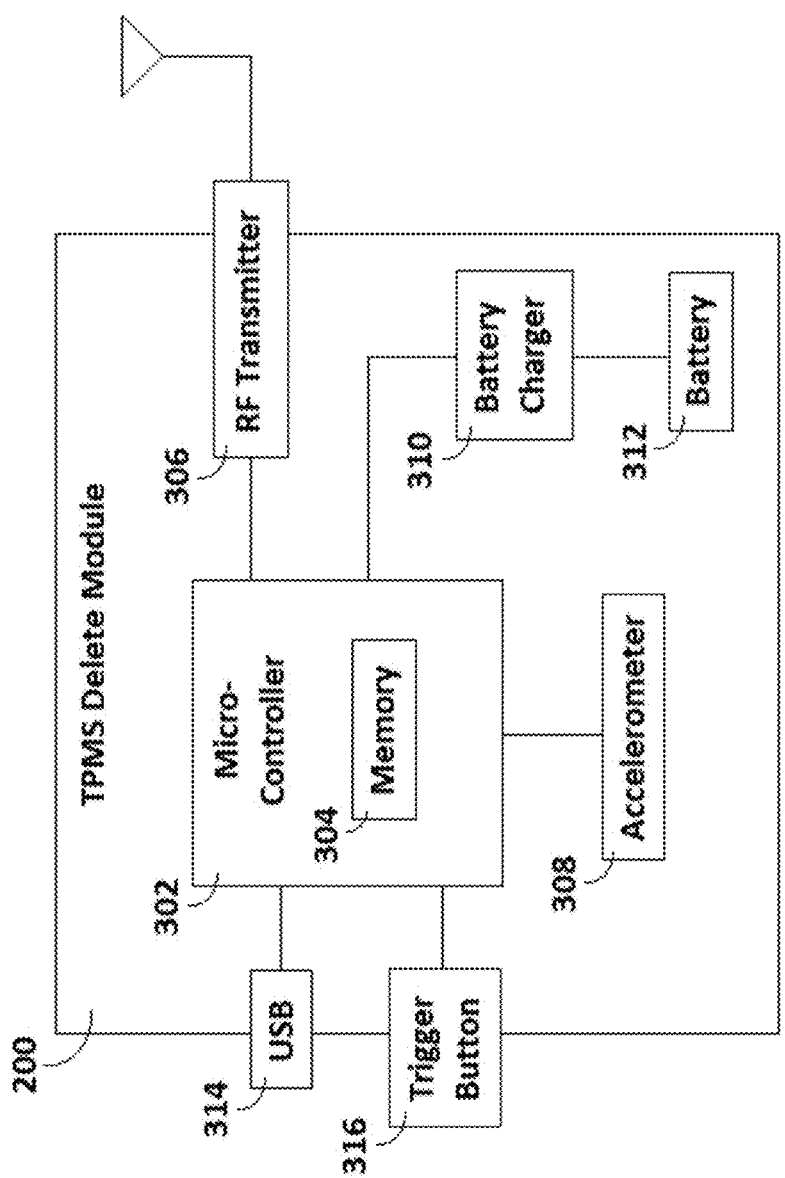
FIG. 3 presents a diagram of various components included in the TPMS emulation device of FIG. 2, according to one embodiment.

Presented in FIG. 3 is a block diagram of the device 200, according to one embodiment. The device 200 has a microcontroller 302, a memory 304, a RF transmitter 306, an accelerometer 308, a battery charger 310, a rechargeable battery 312, a USB port 314 and trigger button 316. The module is equipped with a USB port 314 for supplying the battery charger 310 as well as for installing software on the memory 304. The device 200 can be switched on by activating the accelerometer 308 or manually pressing on the trigger button 316. When pairing the device 200 to the vehicle 100, the trigger button 316 is used to activate the microcontroller which in turn determines an identification signal to be transmitted by the RF transmitter 306. When the accelerometer 308 is triggered by the movement of the vehicle, the microcontroller 302 controls a signal to be transmitted by the RF transmitter 306. As long as the accelerometer 308 is triggered, the device 200 will emit an RF signal every 60 seconds. If no movement is detected within 120 seconds, the device 200 will stop emitting. When updating the device's 200 software, the microcontroller 302 is re flashed via the USB port 314.

A skilled person will recognize that the battery charger 310 and the rechargeable battery 312 could be replaced by any other type of power supply without departing from the scope of the present device 200.

It shall be recognized that the trigger button 316 and the accelerometer 308 can be replaced by another type of suitable actuator. For instance, the trigger button 316 can be replaced by the accelerometer 308, a predefined movement of the device can be used to set the device in learn or pair mode. Moreover, in some applications, the trigger button 316 or the accelerometer 308 can be replaced by a software switch that can be activated via a user interface.

It shall further be recognized that the USB port 312 can be replaced by any other type of suitable communication port adapted to transfer a required software module onto the memory. For instance, the required software module could be transferred onto the memory of the device via a wireless connection. Also, the device may be manufactured without a communication port all together and the memory could have stored thereon the required software.

It shall moreover be recognized that the USB port 312 can be replaced by any other type of power source connector that is adapted to supply the battery charger 310.

According to one embodiment, the TPMS emulation device 200 is manufactured as a universal unit. The device 200 is configurable and can be adapted for any supported vehicle. Indeed, the device 200 functions with any supported vehicle as long as a corresponding software module is loaded within the device 200.

According to one embodiment, the software module has an identifier (ID) generator adapted to generate IDs according to the vehicle make or model. Such identifiers are normally vehicle make specific and are used for pairing the device 200 with each individual wheel, as further explained below.

According to another embodiment, the software module has a transmission interface adapted to produce messages according to a transmission protocol corresponding to the vehicle. The transmission protocol is normally vehicle specific and is required to send signals to the vehicle's 100 onboard computer 102, as further explained below.

Figure 4:
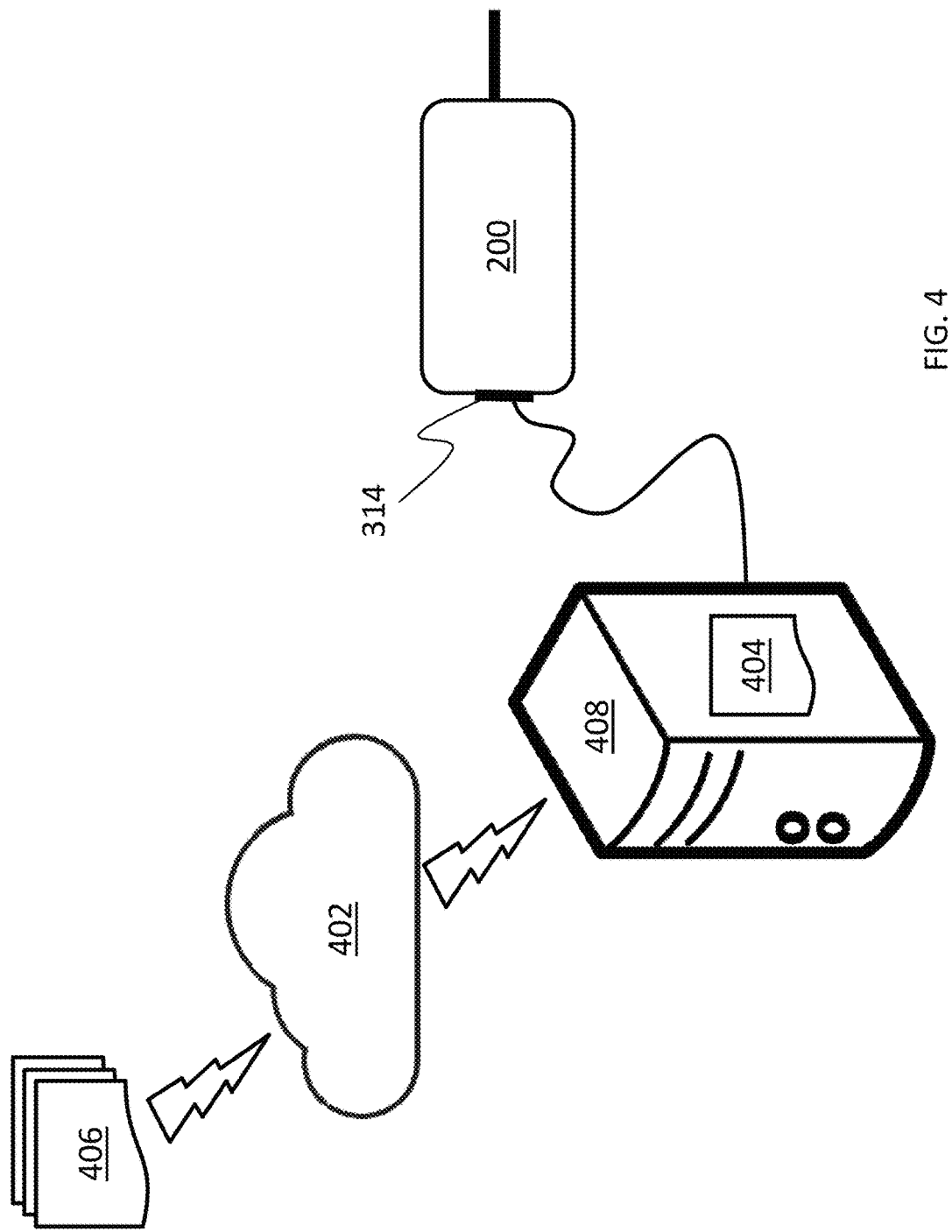
FIG. 4 presents the TPMS emulation device of FIG. 2 connected to a computer for installing a vehicle specific software module, according to one embodiment.

Presented in FIG. 4, according to one embodiment, the device 200 is programmable by installing or loading the software module 404 corresponding to the vehicle on the memory 304 of the device 200. The software module 404 can be selected from a list of modules 406 each associated to a corresponding vehicle make or model. In FIG. 4, the list of modules 406 are stored on a server connected to a network 402 such as an internet network. A computer 408 connected to the network 402 has downloaded thereon the software module 404. The software module 404 is loadable via the USB port 314 that is connected to the computer 408. According to one embodiment, the device 200 is adapted to load a data transfer application on the computer 408 in order to allow communication between the computer 408 and the device 200 and transfer the software module 404 from the computer 408 to the device 200. In this embodiment, the software module 404 has been previously downloaded onto the computer 408 from an Internet website. It shall however be recognized that other methods of transferring the software module 404 onto the computer 408 or directly onto the device 200 are possible such as with a USB key, a CD or the device 200 connected to the network 402, etc.

According to one method of providing such software module, a user is invited to access a web site that is adapted to provide a variety of vehicle specific software modules 406. The web site allows the user to provide a vehicle information by selecting or specifying a vehicle make and/or model corresponding to his vehicle 100 from either a list provided by the web site or by entering the vehicle information, as required. The software module 404 corresponding to the vehicle 100 is then downloaded over to the computer 408. The software module 404 can then be transferred over to the device 200, by using the data transfer application, via a USB connection or by any other method of transferring data such as a WIFI connection, a Bluetooth connection, etc.

Figure 5:
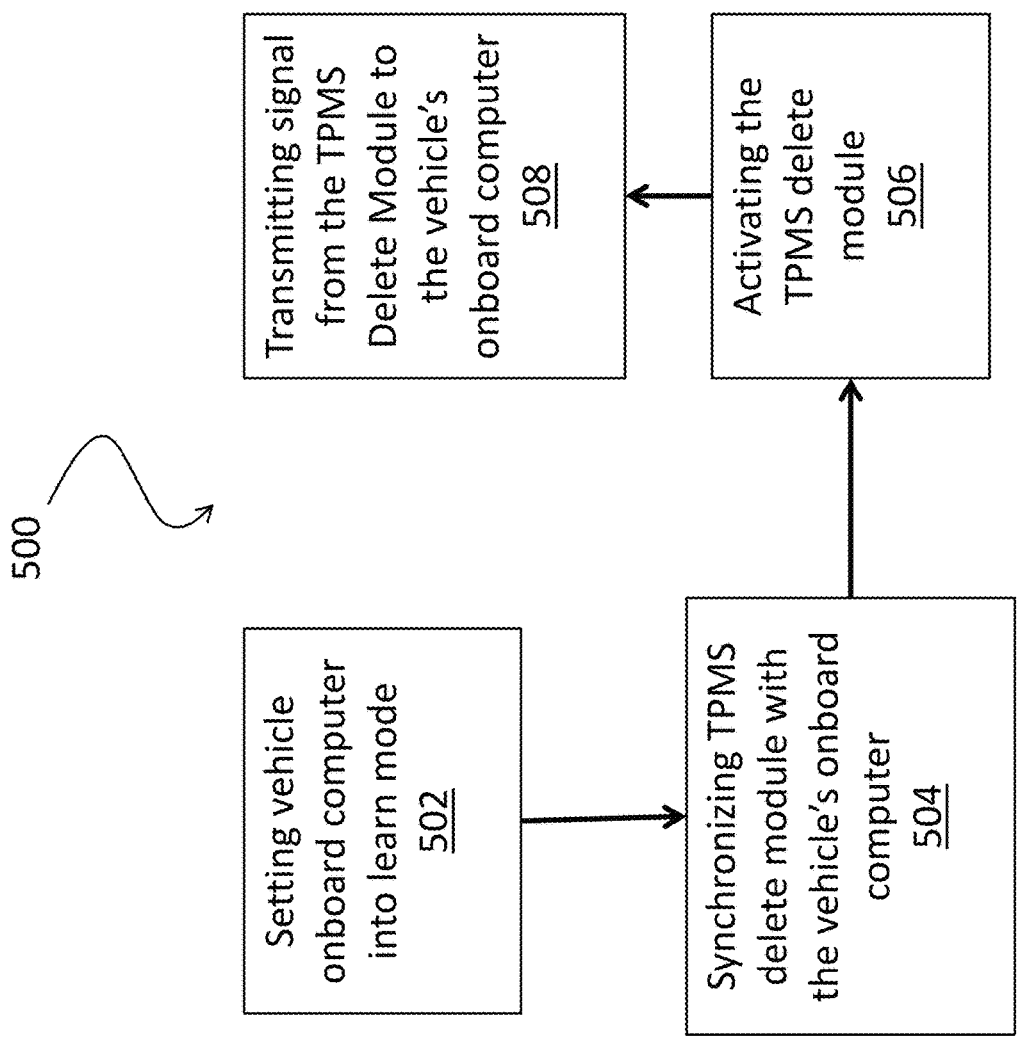
FIG. 5 presents a method of pairing the TPMS emulation device, according to one embodiment.

According to one embodiment, the module 200 having loaded thereon the software module 404 is adapted to synchronize (i.e. pairing mode) with the vehicle 100 according to a TPMS pairing method 500 of FIG. 5. The pairing method 500 includes setting 502 the vehicle's 100 onboard computer 102 into the TPMS relearn/pairing mode according to OEM procedure. The onboard computer 102 is then synchronized with the TPMS emulation device 200 as per instructions which pairs the desired number of identifiers associated to each wheel of the vehicle 100 to the corresponding channel of the onboard computer 102 that corresponds to a vehicle's 100 wheel. Each identifier is sent by pressing on the trigger button 316 for each wheel required to be emulated. The TPMS sensors 104 in the wheels that are in operational condition may remain paired to the onboard computer's 102 associated channel. For instance, the TPMS emulation device 200 may be paired to all of a vehicle's onboard computer 102 channels (wheels) but may be paired to only one channel (wheel), as well.

According to one embodiment, when the onboard computer 102 is set into TPMS pairing mode 502, the onboard computer 102 is adapted to synchronize with the TPMS emulation device 200 when the emulation module sends a predetermined tire pressure information that is indicative of a synchronization mode. For instance, with some vehicle makes, the onboard computer 102 is adapted to synchronize with the TPMS sensors 104 only when it transmits a twenty PSI tire pressure information. In this case, to synchronize the TPMS emulation device 200 in the place of a defective TPMS sensor 104, the TPMS emulation device 200 must transmit a twenty PSI tire pressure information in order to allow the onboard computer 102 to synchronize therewith.

It shall be recognized that other types of tire pressure information, such as other specific tire pressure levels, may be required to allow the onboard computer 102 to synchronize with the TPMS emulation device 200 instead of with the corresponding TPMS sensor 104. The software module is adapted to configure the TPMS emulation device 200 to transmit the required tire pressure information for synchronizing according to the vehicle make.

Once synchronized 504, the unit 200 shall be activated 506 and remain in the vehicle 100, such as in the glove compartment, in order to be able to communicate with the onboard computer 102. The unit 200 will then be adapted to transmit 508 using the channels associated to each wheel the required information to the onboard computer 102. The onboard computer 102 thereby receives a signal indicating an acceptable pressure level and temperature level for all wheels of the vehicle 100 in order to prevent activation of any TMPS related warning indicator, such as a TMPS warning lights, or any other related dashboard feature that might normally be affected by a non-acceptable TMPS related information.

A skilled person will recognize that the unit 200 could have any shape of form and could be part of another device such as a smartphone device or any other wireless electronic device having the capacity to transmit a radio signal.

The invention claimed is:

1. A wireless tire pressure monitoring system (TPMS) emulation device for a vehicle comprising:
    a memory adapted to have stored thereon a software module;
    a microcontroller powered by a power supply and connected to the memory and adapted to control a TPMS transmission signal indicative of an acceptable tire pressure signal, according to the software module;
    a radio frequency transmitter connected to the microcontroller and adapted to transmit the transmission signal, according to the software module;
    a trigger connected to the microcontroller and adapted to activate a TPMS sensor pairing of the emulation device for at least one tire of the vehicle, according to the software module; and
    an actuator connected to the microcontroller and adapted to activate the emulation device.

2. A method of overriding a tire pressure monitoring system (TPMS) sensor device associated with a vehicle tire using a TPMS emulation device, the method comprising:
    setting a vehicle onboard computer into learn mode;
    synchronizing the TPMS emulation device with the onboard computer to take the place of a TPMS sensor device of at least one tire; and
periodically transmitting an emulated signal to the onboard computer to override the TPMS device of said at least one tire.

* * * * *